United States Patent [19]
von Seggern

[11] Patent Number: 4,527,218
[45] Date of Patent: Jul. 2, 1985

[54] STABLE POSITIVELY CHARGED TEFLON ELECTRETS

[75] Inventor: Heinz von Seggern, Peine-Schwicheldt, Fed. Rep. of Germany

[73] Assignee: AT&T Bell Laboratories, Murray Hill, N.J.

[21] Appl. No.: 271,671

[22] Filed: Jun. 8, 1981

[51] Int. Cl.³ .............................................. H01S 4/00
[52] U.S. Cl. ................... 361/233; 29/592 E; 307/400
[58] Field of Search ...................... 361/233; 29/592 E; 307/400

[56] References Cited

U.S. PATENT DOCUMENTS

| | | | |
|---|---|---|---|
| 3,702,493 | 11/1972 | Murphy | 29/592 |
| 3,705,312 | 12/1972 | Sessler et al. | 307/88 |
| 3,706,131 | 12/1972 | Turnhout | 307/400 X |
| 3,924,324 | 12/1975 | Kodera | 361/233 X |
| 3,950,659 | 4/1976 | Dixon et al. | 361/233 X |

FOREIGN PATENT DOCUMENTS

2060259  10/1980  United Kingdom .

OTHER PUBLICATIONS

Applied Physics Letters, vol. 26, No. 12, Jun. 15, 1975, pp. 675-677.
Temperature Dependence of Characteristics of Plastic Film Thermoelectrets, pp. 1356-1359.
Japan Journal of Applied Physics, vol. 16, 1977, No. 5, pp. 863-864.
Journal of Applied Physics, vol. 47, No. 8, Aug. 1976, pp. 3480-3484.
Journal of Applied Physics, vol. 43, No. 3, Mar. 1972, pp. 922-926.
Applied Physics Letters, vol. 24, No. 12, Jun. 15, 1974, pp. 579-580.
Dielectric Properties of Polymers, 1972, Plenum Press, pp. 295-312.
"Electrets", *Thermally Stimulated Discharge of Electrets*, G. M. Sessler, 1980, pp. 177-182.
Journal of Electrostatics, vol. 6, 1979, pp. 373-379.
Thermally-Stimulated Discharge of Polymer Elektrets, 1975, pp. 267-268.
Studies in Electrical and Electronic Engineering 2, 1979, pp. 128-132.

*Primary Examiner*—Reinhard J. Eisenzopf
*Attorney, Agent, or Firm*—James H. Fox

[57] ABSTRACT

A method of producing charged Teflon material having a stable internal positive charge is shown. Partially penetrating positive ions, which may be produced, for example, by a corona discharge or ion beam, are applied to Teflon at an elevated temperature, typically in excess of 100 degrees Celsius for high stability. It has been found that stable internal positive charges may be obtained thereby, having a stability at room temperature in excess of 2,000 years in some cases. This is comparable to the charge stability of negatively internally charged Teflon articles. Regions of both positive and negative internal charges may be included in the same article. Various charged Teflon devices may be made, including microphones, loudspeakers, electrostatic air filters, etc. Intermediate levels of charge stability, less than the maximum obtainable, may also be produced.

11 Claims, 4 Drawing Figures

THERMALLY STIMULATED DISCHARGE OF POSITIVELY CORONA CHARGED FEP

THERMALLY STIMULATED DISCHARGE OF POSITIVELY CORONA CHARGED FEP

STABLE POSITIVELY CHARGED TEFLON ELECTRETS

BACKGROUND OF THE INVENTION

1. Field of the Invention

This invention relates to a method of producing Teflon electrets having an internal positive charge and improved charge stability, and devices made therefrom.

2. Description of the Prior Art

Electrets are dielectric materials having a net electric charge in at least a portion of the material or on a surface thereof. Although electrets are sometimes defined as having an electric polarization (i.e., an equal number of positive and negative charges separated by a distance), the term as used in the art also includes dielectric materials having a net positive or negative charge. When made of polymer material such as Teflon, electrets are frequently used as electromechanical transducers for microphones, earphones, speakers, etc. Teflon, a registered trademark of E. I. Dupont Company for solid, polymerized $CF_2$, is a common material for making an electret, due to its ability to retain a high degree of surface charge over a period of time. One typical method of charging a Teflon electret material is by means of a corona discharge technique, wherein an ionized gas forms one electrode to the Teflon being charged; see, for example, U.S. Pat. No. 3,702,493. By this and other methods, including penetrating ion or electron beam charge injection, an internal excess charge of the material can be achieved. In addition, a surface charge can be applied to the electret by conventional techniques. The charges on opposite surfaces may be of the same or opposite polarity.

It is further recognized in the prior art that when charging a Teflon electret, as by the corona ionization process, the stability of the charge on the electret can be improved by charging at an elevated temperature; see, for example, "Polymer Electrets Corona-Charged At High Temperature", by S. S. Bamji et al, in the Journal of Electrostatics, Vol. 6, pages 373-379, (1979). However, for producing a stable internal charge in Teflon, the prior art knew only the introduction of negative charge into the material. It has been widely believed that positive internal charges are inherently unstable in Teflon material; see, for example, "Thermally Stimulated Discharge Of Polymer Electrets", by J. V. Turnhout, Elsevier Publishers, Amsterdam, Oxford, and New York, (1975), at pages 267-268. As noted in that reference, it was conventionally believed that the observed much higher mobility of positive charge carriers in Teflon made positively internally charged Teflon inherently less stable than negatively charged Teflon electrets. This was due in part to the belief that electrons could be more stably trapped in deep energy traps in Teflon, because fluorine atoms are highly electronegative.

However, it is highly desirable to also obtain Teflon electrets having a stable positive internal charge. This would allow new applications in electromechanical transducers, electrostatic motors, electrostatic air filters, etc. In particular, the design of a push-pull type electrostatic headphone is simplified if an electrostatic element can contain both positive and negative charges. To overcome the poor internal charge stability of positively charged electrets, recourse has been made to try to obtain stable surface charges. For example, it has been found that positive surface charges can be more stably produced on Teflon electrets if the surface is corrugated; see, for example, "Plate Electrets And Their Use In Condenser Type Headphones", by S. Tamura et al in Charge Storage, Charge Transport, And Electrostatics With Their Applications, edited by Y. Wada et al, at pages 128-132, (1979). The surface-charging technique avoids the problem of high mobility of positive charges in the internal portion of the material, since the surface trapping states are different than the internal trapping states.

However, surface charges are typically limited to a depth of about 4 microns in Teflon material. In order to obtain a strengthened electrostatic charge, and allow for new device configurations, it would be desirable to be able to obtain a stable internal positive charge in Teflon material.

SUMMARY OF THE INVENTION

I have discovered a method whereby Teflon material, including polyfluoroethylenepropylene (FEP) and polytetrafluoroethylene (PTFE), can obtain a stable positive internal charge. In this method, Teflon material is charged by injecting positive charges. This is typically accomplished by subjecting it to a positive corona discharge or another source of partially penetrating, positively charged ions. The charging is accomplished at an elevated temperature, typically at least 100 degrees Celsius, but less than the melting temperature of the Teflon material. Internal charges produced by this technique reside substantially below the surface of the Teflon material; that is, the mean depth of the charge is greater than 4 microns below the surface. Optionally, conventional charging techniques can be used to obtain a surface charge on the Telfon material. Regions of negative internal charge can also be obtained in portions of the material.

DETAILED DESCRIPTION

The following detailed description relates to a method of obtaining stable, positively bulk-charged Teflon electrets.

Figure 1:
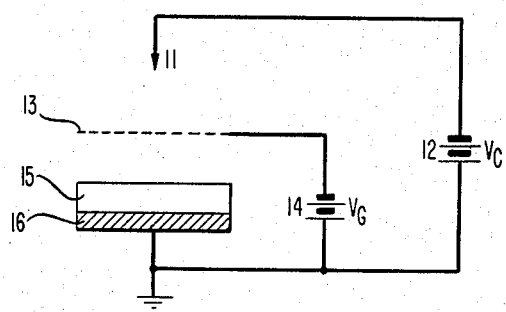
FIG. 1 shows a typical corona-charging apparatus for use in practicing the present invention.

Contrary to the above-noted teachings on the subject, I have found that stable, positively bulk-charged Teflon electrets are possible by performing the charging at an elevated temperature, typically in excess of 100 degrees Celsius. Prior art conora-charging techniques or other charge injection techniques can be utilized for generating the positive charges. In a first embodiment, positive charges are generated by corona-charging apparatus, as shown in FIG. 1. A corona needle 11 is connected to the positive side of a potential source 12, typically at a voltage of several kilovolts above ground. A control grid 13 is placed at a positive potential with respect to ground by potential source 14. This is used for controlling the charge injection of sample 15, which is in contact with grounded metal layer 16. Potential source 14 is typically on the order of a few hundred volts positive with respect to ground. Other charging apparatus can be used, as for example, as disclosed in U.S. Pat. No. 3,705,312, assigned to the same assignee as the present invention.

It has been discovered that the stability of positively bulk-charged FEP and PTFE material is greatly improved when the charging takes place at an elevated temperature, typically in excess of 100 degrees Celsius, as will be more fully illustrated by means of the following Examples:

EXAMPLE 1

Figure 2:
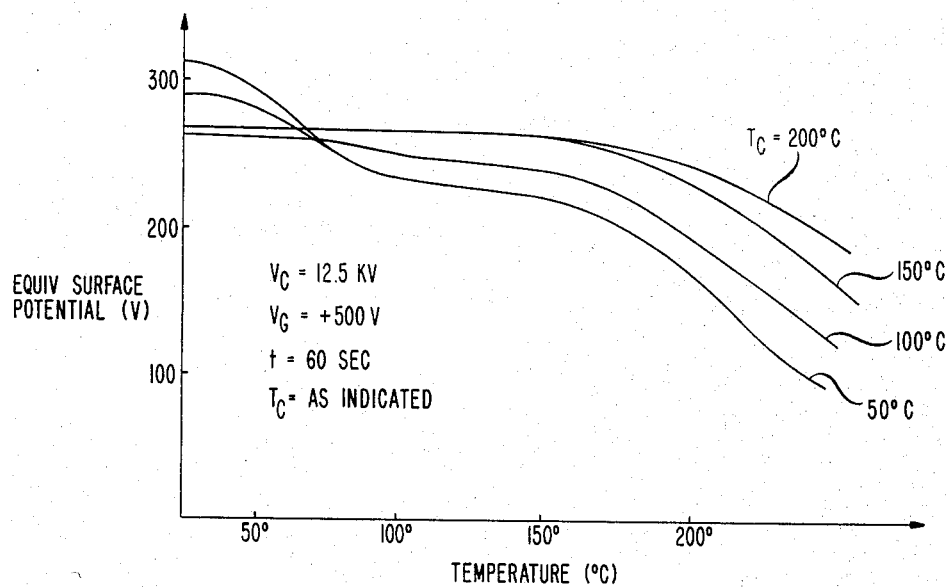
FIG. 2 shows thermally stimulated discharge curves of positively charged Teflon PTFE.

A Teflon PTFE sample, 25 micrometers thick, was charged with the above apparatus for a 60-second period for various temperatures Tc, as noted in FIG. 2. The positive potential source 12 produced a voltage of 12.5 kilovolts above ground, while source 14 produced a voltage on grid 13 of 500 volts positive with respect to ground. The surface potential of the charged electret with respect to ground was determined and is shown by the curves of FIG. 2. The thermally stimulated discharge (TSD) measurement is a well-known technique for estimating long-term stability. For example, the sample charged at 100 degrees Celsius starts to exhibit a drop-off of the TSD curve at temperatures in excess of 150 degrees Celsius, indicating an estimated lifetime of greater than 200 years at 20 degrees Celsius in a dry atmosphere. The sample charged at 200 degrees Celsius has a TSD curve which drops off above approximately 175 degrees Celsius, indicating a lifetime of approximately $2 \times 10^3$ years at 20 degrees Celsius in a dry atmosphere.

EXAMPLE 2

Figure 3:
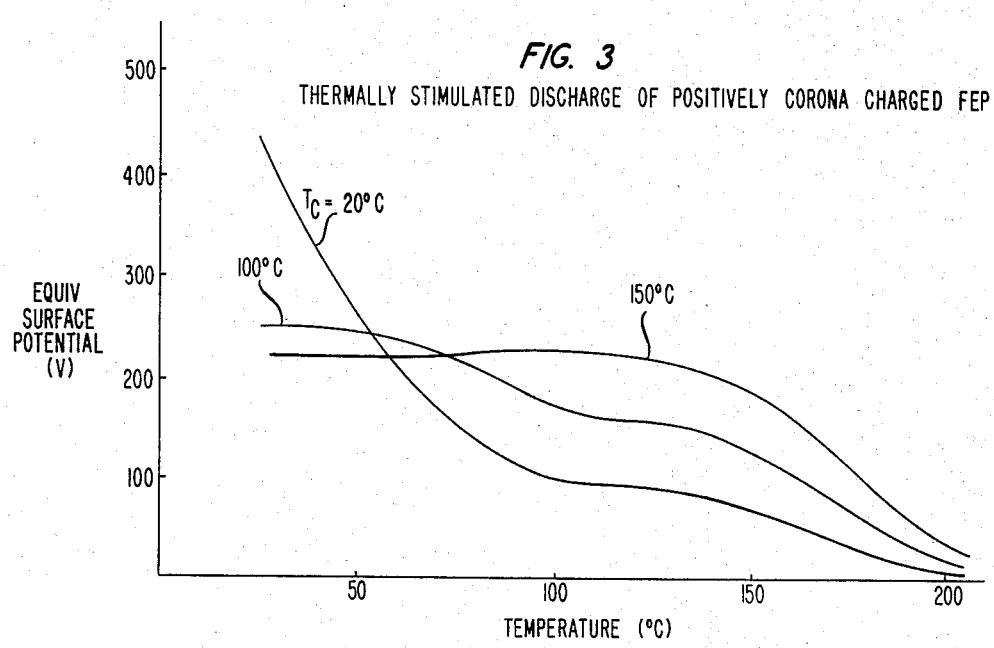
FIG. 3 shows thermally stimulated discharge curves of positively charged Telfon FEP.
Figure 4:
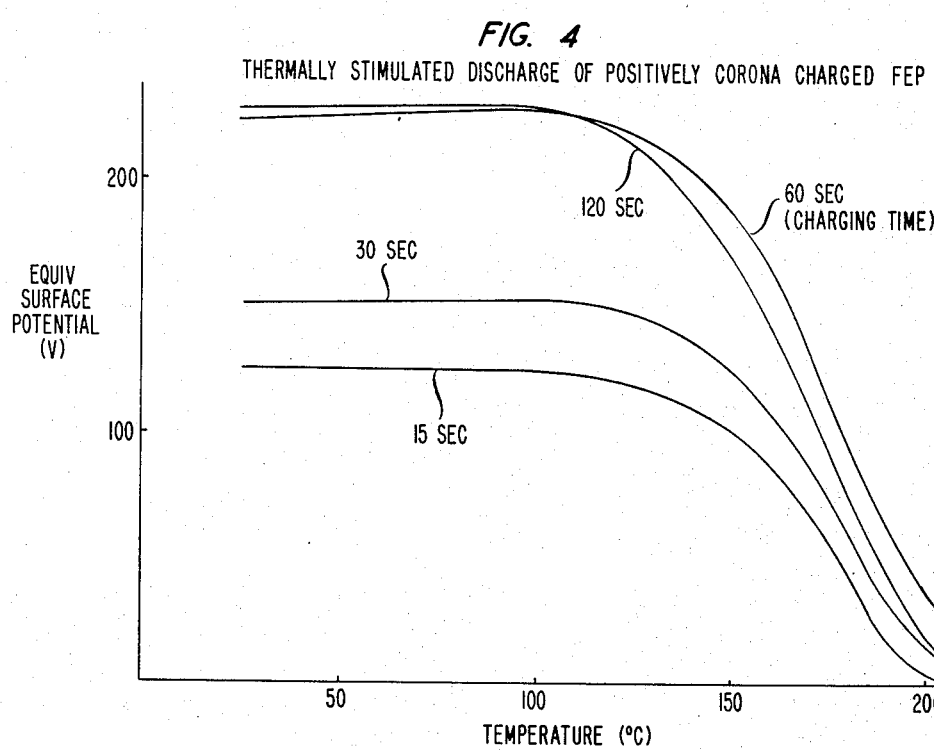
FIG. 4 shows thermally stimulated discharge curves for positively charged Teflon FEP, wherein the Effective charging time is shown.

A 25 micrometer thick sample of Teflon FEP (commercial grade FEP-A) was charged with the above apparatus under the same conditions noted in the above Example. Results of the TSD measurements are shown in FIG. 3. The curve for the room temperature (Tc=20 degrees Celsius) charging temperature shows a substantial drop-off at temperatures above approximately 30 degrees Celsius, indicating a lifetime of only about 1 day at 20 degrees Celsius in dry atmosphere. On the other hand, the curve for the sample charged at 100 degrees Celsius shows an initial drop-off above approximately 60 degrees Celsius but retains a substantial charge until a second drop-off occurs at temperatures above about 140 degrees Celsius, indicating a substantially improved long-term stability. The curve for the sample charged at 150 degrees Celsius shows an even higher level of long-term retention, and begins to drop off at approximately the same temperature as the 100 degree sample, indicating a long-term stability of approximately 160 years. The effect of the charging time for the Teflon FEP sample is shown in FIG. 4. Samples 25 micrometers thick were charged for 15, 30, 60, and 120 seconds, with the resulting TSD curves plotted. For these samples, it can be seen that a charging time of approximately 60 seconds was optimum. It is expected that thicker samples typically require longer optimum charging times, while thinner samples typically have shorter optimum charging times.

The above Examples show that contrary to earlier teaching, stable, positively bulk-charged Teflon electrets can be produced. In order to verify that the electrets were bulk charged—that is, the charges resided substantially below the surface—the heat pulse technique developed by Collins was employed to determine the location of the trapped charges; see "Distribution of Charge in Electrets", R. E. Collins, Applied Physics Letters, Vol. 26, pages 675–677 (1975). It was found that for the above Examples 1 and 2, the mean depth of positive charge occurred approximately in the center of the samples, which indicates that the positive charge is distributed throughout the interior of the sample. As noted above, it is known that surface charges—that is, charges trapped at a depth of less than about 4 micrometers from the surface—can also be produced having a certain degree of charge stability. Thus, the above bulk-charged samples can also have a positive or negative surface charge applied thereto, according to techniques known in the art.

The above samples were charged by means of a corona discharge technique. The mean-free path between trapping events of the positive charge carriers at 100–150 degrees Celsius was greater than the sample thickness, and approximately one-third of the charged carriers were trapped in the sample, with the rest penetrating through the sample. An ion beam having a kinetic beam energy on the order of one hundred million electron volts can be used to produce a similar charge distribution. As used herein, the term "partially penetrating ion beam" means an ion beam that injects a substantial amount of positive charges into the Teflon material at a depth greater than 4 micrometers from the surface. It does not preclude surface charging by said beam, nor does it preclude the possibility that a substantial amount of the ions penetrate through the sample and exit therefrom. Furthermore, regardless of where the charges are initially trapped in the interior of the sample, heating to the above temperatures will tend to distribute the trapped charges more evenly throughout the interior of the sample. Thus, charging can also be accomplished by injecting charge to a depth of less than 4 micrometers, accompanied by heating for a sufficient time to obtain an internal charge distribution to depths greater than 4 micrometers.

The stability of the above samples compares favorably with negatively corona-charged samples. Prior art studies have shown, for example, that at a charging temperature of 150 degrees Celsius, Teflon FEP has a typical estimated charge stability of a few thousand years. The foregoing stability estimates based upon TSD measurements are applicable to Teflon samples stored in a vacuum or in a dry atmosphere, wherein conduction of ions or other charged species through the atmosphere is minimal. In practice, the actual charge retention times may be less than the estimates because of humidity and ion exchange through the air. However, the estimates are useful for showing that the positively internally charged Teflon can be made with greatly increased stability, typically comparable to that previously obtained only with negatively charged electrets. A useful measure of charge stability is the time constant of the charge decay rate of the internal positive charge. This is defined as the time that the equivalent surface potential of the material due to the internal positive charges drops to 1/e of its initial value. For the above Examples, material having a time constant in excess of 100 years at 20 degrees Celsius in a dry atmosphere is obtained for sufficiently elevated charging temperatures.

The ability to obtain positively charged Teflon allows the design of new and improved transducers, motors, air filters, etc. For example, an electret motor can be designed, whereby positive and negative charges reside at different ends of an electret armature. For obtaining the alternating regions of positive and negative charges, partially penetrating ion or electron beams can be employed to achieve the polarization as noted above, or corona discharge needles of opposite polarities can be employed. Numerous other configurations are now possible using Teflon elements made according to the above technique. In addition, in the prior art, negatively charge Teflon elements were used as air filters to eliminate positively charged ions and particles from the atmosphere. With the present inventive technique, electrostatic air filters can now be employed for removing negatively charged ions and particles from the atmosphere. When used in transducer applications, the charge injection and heating are typically accomplished to obtain an equivalent surface potential of at least 100 volts on the Teflon material over the life of the device. This corresponds to an equivalent surface charge density of at least $7.6 \times 10^{-9}$ coulombs/cm$^2$ for a 25 micrometer thick Teflon sample. A typical device lifetime, for example, can be in excess of 20 years.

While the above embodiments have stressed the high charge stability of positively charged electrets, there are also cases in which a controlled discharge of the electret is desirable. For example, in medical uses, negatively charged electret bandages having a controlled discharge rate are believed to emit negative charges which are believed to aid in the healing of certain types of injuries. The use of positively charged Teflon bandages may be advantageous for certain other medical uses, wherein it is desired to emit positive charges at a controlled rate. For these uses, the electrostatic element would typically not be charged at as high a temperature as for the uses requiring higher charge stability. By using the TSD curves, an appropriate charging temperature can be found to obtain a desired degree of positive charge emission over the desired period of time. As used herein, the term "elevated temperature", when applied to the charging of positively charged Teflon electrets, means a temperature substantially in excess of room temperature (20 degrees Celsius), whereby the inventive teachings are employed to obtain a desired result, whether it be maximum charge stability or an intermediate degree of charge stability. All such variations and deviations through which the above teachings have advanced the art are considered to be within the spirit and scope of the present invention.

What is claimed is:

1. A method of making an article CHARACTERIZED by injecting positive charges into at least a portion of a material selected from the group consisting of polyfluoroethylenepropylene and polytetrafluoroethylene,
   wherein said material is at an elevated temperature during said injecting, thereby obtaining an increase in charge stability of the injected positive charges residing in an internal portion of said material at a depth greater than 4 micrometers from the surface of said material.

2. The method of claim 1 FURTHER CHARACTERIZED in that said temperature is at least 100 degrees Celsius.

3. The method of claim 1 FURTHER CHARACTERIZED in that said injecting is accomplished by means of a corona discharge.

4. The method of claim 1 FURTHER CHARACTERIZED in that said injecting is accomplished by means of a partially penetrating ion beam, wherein said ions are injected to a mean depth greater than 4 mircons from the surface of said material.

5. The method of claim 1 FURTHER CHARACTERIZED by negatively charging portions of said material, whereby at least one positively charged internal region and at least one negatively charged internal region subsist in said material.

6. The method of claim 1 FURTHER CHARACTERIZED by applying a surface charge to said material.

7. The method of claim 1 FURTHER CHARACTERIZED in that said injecting is accomplished at a temperature whereby the time constant of the charge decay rate of the internal positive charges in said material at 20 degrees Celsius is in excess of 100 years in a dry atmosphere.

8. An article made according to the method of claim 1.

9. An article comprising a material selected from the group consisting of polyfluoroethylenepropylene and polytetrafluoroethylene,
   CHARACTERIZED IN THAT the time constant of the charge decay rate of the internal positive charges residing at a depth greater than 4 micrometers in said material at 20 degrees Celsius is in excess of 100 years in a dry atmosphere.

10. The article of claim 9 FURTHER CHARACTERIZED in that said material has an equivalent surface potential due to said internal positive charges of greater than 100 volts.

11. The method of claim 1 FURTHER CHARACTERIZED in that said injecting is accomplished by introducing positive charges to a depth of less than 4 micrometers, and heating said material for a sufficient time to obtain an internal positive charge distribution to depths greater than 4 micrometers.

* * * * *